July 28, 1942.    H. A. CLARK    2,291,569
OIL SEAL
Filed Dec. 27, 1940
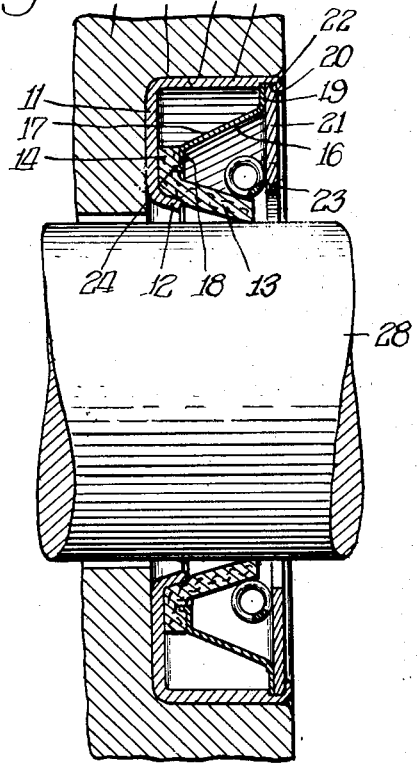
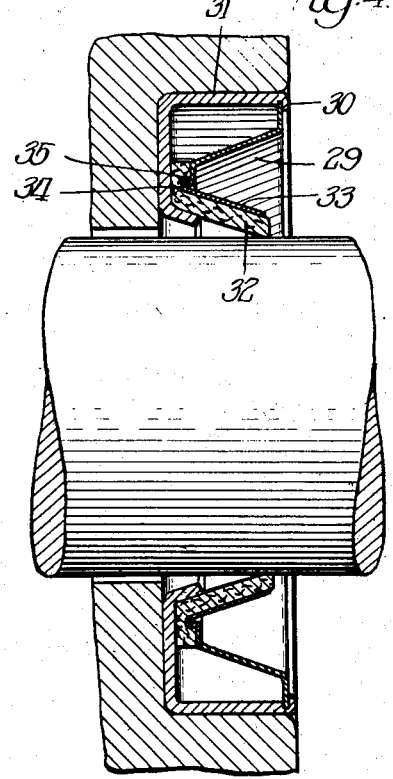
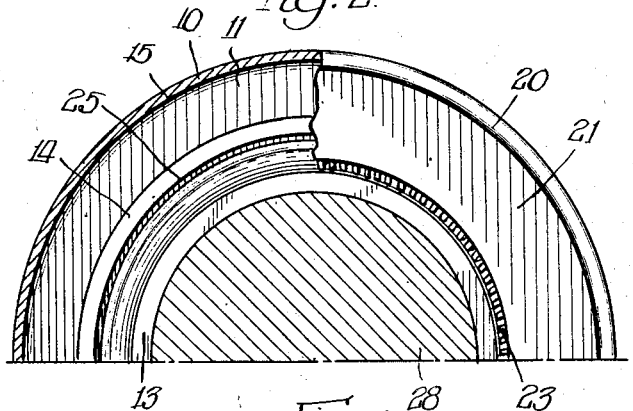
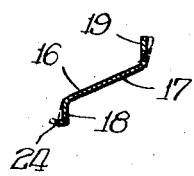
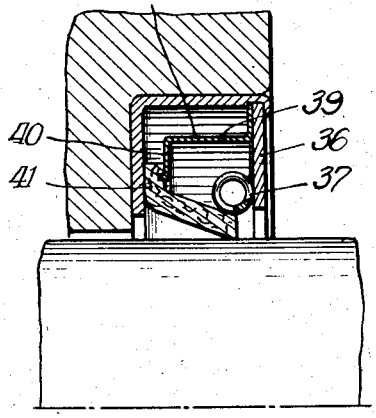
INVENTOR.
Harold A. Clark,
BY Cromwell, Greist & Warden
ATTYS.

Patented July 28, 1942

2,291,569

UNITED STATES PATENT OFFICE 2,291,569

OIL SEAL

Harold A. Clark, Miami Beach, Fla.

Application December 27, 1940, Serial No. 371,882

4 Claims. (Cl. 288—3)

This invention has to do with oil seals of the type designed for insertion as a self-contained unit in a bore in a housing about a shaft passing through the bore.

The principal purpose of the invention is to provide an improved seal of the type described which can be manufactured inexpensively, which will function effectively to prevent leakage of oil from the housing along the shaft, and which will not have its effectiveness impaired upon becoming oil-soaked with long usage.

While the foregoing statements are indicative in a general way of the nature of the invention, other more specific objects and advantages will be apparent to those skilled in the art upon a full understanding of the construction of the improved seal.

A preferred embodiment of the invention and two modifications thereof are presented herein for the purpose of exemplification, but it will of course be appreciated that the invention is susceptible of incorporation in still other structurally modified forms coming equally within the scope of the appended claims.

In the accompanying drawing:

Fig. 1 is a diametric section through a seal constructed in accordance with the invention, showing the seal inserted in a bore in a housing about a shaft passing through the bore;

Fig. 2 is a partially broken away face view of one-half of the seal;

Fig. 3 is a radial section through the thin spring metal clamping ring which forms a part of the seal;

Fig. 4 shows, in a view similar to Fig. 1, a modified form of the invention; and Fig. 5 shows, in a similar view, a further modified form.

The seal illustrated in Fig. 1 includes a centrally apertured sheet metal cup 10. The bottom 11 of the cup is provided, about the edge of the aperture therein, with a narrow reentrant flange 12 of generally conical form. The cup 10 contains a packing ring 13 of leather, synthetic rubber, or other suitable packing material. The packing ring 13 is of generally conical form, and is provided, at its large diameter end, with a narrow outwardly extending flange 14, which flange is of considerably smaller diameter, however, than the rim 15 of the cup. The packing ring 13 is positioned in the cup with the large diameter end of the same sleeved snugly over the flange 12 of the cup and with the flange 14 clamped tightly against the bottom 11 of the cup some distance inwardly from the rim 15 of the latter.

The cup 10 also contains a thin spring metal clamping ring 16, which clamping ring, like the packing ring 13, is of generally conical form. The clamping ring 16 is resiliently compressible to a limited extent in a direction axially of the same. The clamping ring 16 is characterized by a conical intermediate section 17; a narrow inwardly extending flange 18 at its small diameter end, which flange is of substantially the same radial dimensions as the flange 14 on the packing ring; and a narrow outwardly extending flange 19 at its large diameter end, which latter flange is of substantially the same diameter as the inside of the rim 15 of the cup. The clamping ring 16 is positioned in the cup outwardly of the packing ring 13, and is compressed axially, under substantial pressure applied at the time of assembly, with the inwardly extending flange 18 (hereinafter referred to as the pressure foot) on the clamping ring engaging the flange 14 (hereinafter referred to as the stub flange) on the packing ring and with the outwardly extending flange 19 on the clamping ring fitting closely within the rim of the cup, preferably in a shallow counterbore 20 provided in the latter. The clamping ring 16 is held under pressure in this position by a centrally apertured sheet metal washer 21 which is located in the counterbore 20 against the outwardly extending flange 19 on the clamping ring and is permanently held in place by an inwardly turned bead 22 on the edge of the rim 15. The washer 21, in addition to maintaining the desired axial pressure on the clamping ring 16, constitutes a retainer for an endless coil spring 23 which encircles the small diameter end of the packing ring.

The pressure foot 18 of the clamping ring 16 is maintained in centered and radially interlocked association with the stub flange 14 on the packing ring 13 by a small axially turned flange 24 on the inner edge of the pressure foot 18, which flange is embedded within a groove 25 in the opposed face of the stub flange 14.

With the construction above described the packing ring 13 is securely and permanently maintained in sealed engagement with the cup, in fixed association with the latter. The pressure ring 16 presses the stub flange 14 resiliently at all times against the bottom 11 of the cup, providing a real spring action which compensates for any looseness which might otherwise develop through gradual flattening out of the stub flange 14 caused either by the continued pressure, the soaking with oil of the material of the packing ring, or the loss of filler in the material. The pressure ring 16 also centers the packing ring accurately with respect to the cup by reason of its radially interlocked association with the stub flange 14 on the packing ring. Because of the relatively small outside diameter of the stub flange 14 of the packing ring, comparatively little packing material is required.

In the assembled condition of the seal the flanges 18 and 19 on the clamping ring 16 are preferably disposed in planes at right angles to the axis of the seal, but before assembly of the parts under pressure these flanges are preferably inclined away from each other, as shown in Fig. 3, whereby to store up the desired resiliency in the clamping ring at the time that the latter is placed under axial pressure in the assembly.

The seal is adapted to be press-fitted as a self-contained unit into a bore 26 in a housing 27, with the small diameter end of the packing ring 13 in relatively rotatable fluid-tight engagement with the periphery of a shaft 28 passing through the bore.

In the modification shown in Fig. 4 the retaining washer 21 is omitted and the outer edge of the large diameter end of the clamping ring 29 is engaged directly by the bead 30 on the edge of the rim of the cup 31. In this modification the packing ring 32, instead of being constricted about the shaft by an endless coil spring 23, is constricted by a finger spring ring 33 of substantially the same shape as the outer surface of the packing ring. The finger spring ring 33 is provided, at its large diameter end, with a narrow outwardly extending flange 34 which is engaged by the pressure foot 35 of the clamping ring 29.

In the modification shown in Fig. 5 a retaining washer 36 is again employed, in combination with an endless coil spring 37. In this modification, as in the other herein described forms, the clamping ring 38 is of generally conical form in that it is larger at one end than at the other and is arranged diagonally of the casing. The intermediate portion 39 of the clamping ring, instead of being conical, is cylindrical, and the pressure foot 40 of the clamping ring is correspondingly wider and extends outwardly some distance beyond the outer periphery of the stub flange 41 on the packing ring before joining up with the intermediate portion 39. This outward extension or overhang permits the inner portion of the pressure foot which engages the packing to be resiliently flexed in a direction axially of the clamping ring when the several parts of the seal are clamped together under pressure at the time of assembly.

If desired, the clamping ring 39, instead of being made of thin spring metal, can be constructed of heavier relatively rigid sheet metal, in which case the spring action referred to will be eliminated. A similar change can of course be effected in other embodiments of the invention.

While the sealing device of the present invention is referred to as an "oil" seal, it will of course be understood that the same is not limited in its use to oil and that the word "oil" is intended to include within its meaning any and all fluids capable of being sealed with the device.

I claim:

1. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, and a clamping ring of generally conical form which is provided at its small diameter end with a pressure foot of substantially the same size as the flange on the packing ring, said clamping ring being positioned in the cup outwardly of the packing ring with the foot on the clamping ring engaging the flange on the packing ring in axially clamped and radially interlocked association with the latter and with the large diameter end of the clamping ring secured under axial pressure within the rim of the cup.

2. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, and a spring metal clamping ring of generally conical form which is resiliently compressible in a direction axially of the same and is provided at its small diameter end with a pressure foot of substantially the same size as the flange on the packing ring, said clamping ring being positioned in the cup outwardly of the packing ring and being compressed axially with the foot on the clamping ring engaging the flange on the packing ring in axially clamped and radially interlocked association with the latter and with the large diameter end of the clamping ring secured under axial pressure within the rim of the cup in engagement with the rim.

3. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, and a spring metal clamping ring of generally conical form which is resiliently compressible in a direction axially of the same and is provided at its small diameter end with a pressure foot of substantially the same size as the flange on the packing ring, said clamping ring being positioned in the cup outwardly of the packing ring and being compressed axially with the foot on the clamping ring engaging the flange on the packing ring in axially clamped and radially interlocked association with the latter and with the large diameter end of the clamping ring secured under axial pressure within the rim of the cup in engagement with the rim, and said pressure foot being provided about its inner edge with a small axially extending flange which is embedded within a groove in the opposed face of the flange on the packing ring.

4. In an oil seal of the self-contained unit type, a centrally apertured sheet metal cup, a flexible packing ring of generally conical form which is provided at its large diameter end with a narrow outwardly extending flange, which flange is of considerably smaller diameter than the rim of the cup, said packing ring being positioned in the cup with the flange of the packing ring clamped against the bottom of the cup about the aperture in the latter, and a clamping ring having a large diameter end which is substantially the same size as the rim of the cup and a small diameter end which is of substantially the same size as the flange on the packing ring, said clamping ring being positioned in the cup outwardly of the packing ring with the small diameter end of the clamping ring engaging the flange on the packing ring in axially clamped association with the same and with the large diameter end of the clamping ring secured under axial pressure within the rim of the cup.

HAROLD A. CLARK.